(12) United States Patent
Shaam

(10) Patent No.: US 8,276,763 B2
(45) Date of Patent: Oct. 2, 2012

(54) FILTER CARTRIDGE WITH FLOW PASSAGE IN END PLATE

(75) Inventor: Naren Shaam, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 851 days.

(21) Appl. No.: 11/841,071

(22) Filed: Aug. 20, 2007

(65) Prior Publication Data

US 2009/0050554 A1 Feb. 26, 2009

(51) Int. Cl.
*B01D 27/00* (2006.01)
*B01D 29/19* (2006.01)
*B01D 29/00* (2006.01)

(52) U.S. Cl. ............ 210/493.2; 210/450; 210/455; 210/236

(58) Field of Classification Search .......... 210/450, 210/236, 455, 493.2, 235
See application file for complete search history.

(56) References Cited

U.S. PATENT DOCUMENTS

| 3,880,757 | A | * | 4/1975 | Thomason | 210/167.28 |
| 4,615,812 | A | * | 10/1986 | Darling | 210/805 |
| 5,022,986 | A | * | 6/1991 | Lang | 210/94 |
| 5,250,179 | A | * | 10/1993 | Spearman | 210/315 |
| 5,264,119 | A | * | 11/1993 | Rollins et al. | 210/90 |
| 5,858,227 | A | * | 1/1999 | Stone et al. | 210/234 |
| 2004/0232059 | A1 | * | 11/2004 | Gustafson et al. | 210/232 |

* cited by examiner

*Primary Examiner* — Nam Nguyen
*Assistant Examiner* — Madeline Gonzalez
(74) *Attorney, Agent, or Firm* — Hamre, Schumann, Mueller & Larson, P.C.

(57) ABSTRACT

A filtration system, for example a fuel filtration system in an engine, that helps prevent engine operation when there is no filter cartridge installed or a non-recommended and/or inferior filter cartridge is installed. The filter cartridge includes first and second endplates, one of which includes a fluid flow passage therein through which fluid can flow. The flow passage connects the clean fluid from the filter to a clean fluid outlet.

24 Claims, 2 Drawing Sheets

FILTER CARTRIDGE WITH FLOW PASSAGE IN END PLATE

FIELD

The invention generally pertains to the field of filtration, and more particularly to filtration systems providing mechanisms which help ensure that the filter that is used meets manufacturer specifications and requirements and prevents inferior, non recommended filters being used on the engine.

BACKGROUND

Engines are used for a multitude of purposes throughout the world. Many engine manufacturers recommend a specific filter to be used with each of their engines for filtering fluids used in the engines. Problems occur, however, when filters are periodically replaced. Often, a filter is replaced with an inferior, non-recommended filter. In response, some filtration systems, for example fuel filtration systems, have been designed that require use of a specific filter design. In the case of fuel filtration systems, these "no filter, no run", filtration systems not only require that a filter be present, but the correct filter design must be used, in order to have sufficient fuel flow for the engine to operate.

BRIEF SUMMARY

A filtration system is described that helps prevent use of non-recommended and/or inferior filter cartridges in filtration systems. The filtration system can be designed for use in filtering fluids used in engines, for example fuel, lubrication, hydraulic, and air, as well as in other applications requiring fluid filtration. In the case of fuel filtration, the filter cartridge can be designed to prevent engine operation if no filter cartridge or the incorrect filter cartridge is installed.

In one embodiment, a filter cartridge is provided that includes first and second endplates. One of the endplates, for example the second endplate, includes a flow passage therein through which fluid can flow. The flow passage connects the clean fluid from the filter to a clean fluid outlet.

In another embodiment, the filter cartridge includes a clean fluid outlet fitting on the second endplate. The clean fluid outlet fitting is offset from the central axis of the filter cartridge, and engages in a corresponding offset guide formed in the filter housing that houses the cartridge.

In the case of fuel filtration, this filter cartridge and filter housing design permits the clean fuel outlet to be located on the side of the housing or anywhere on the bottom of the housing, rather than restricting the fuel outlet to the center axis of the housing.

In addition, if an incorrect filter cartridge is used, the bottom plate of the incorrect filter cartridge will block the offset outlet fitting, thereby preventing fluid from flowing to the outlet to prevent engine operation or causing insufficient fluid to flow to the engine for the engine to run properly. When an incorrect filter cartridge or no filter cartridge is installed, an amount of fuel can be permitted to flow that is sufficient to lubricate downstream protected components, such as a fuel pump, but insufficient to permit engine operation.

A valve mechanism can be provided in the outlet. The valve is normally closed when a filter cartridge is not installed to prevent flow of unfiltered fluid to the clean side. The valve mechanism is actuated open by the filter cartridge when it is installed.

DETAILED DESCRIPTION

Figure 1:
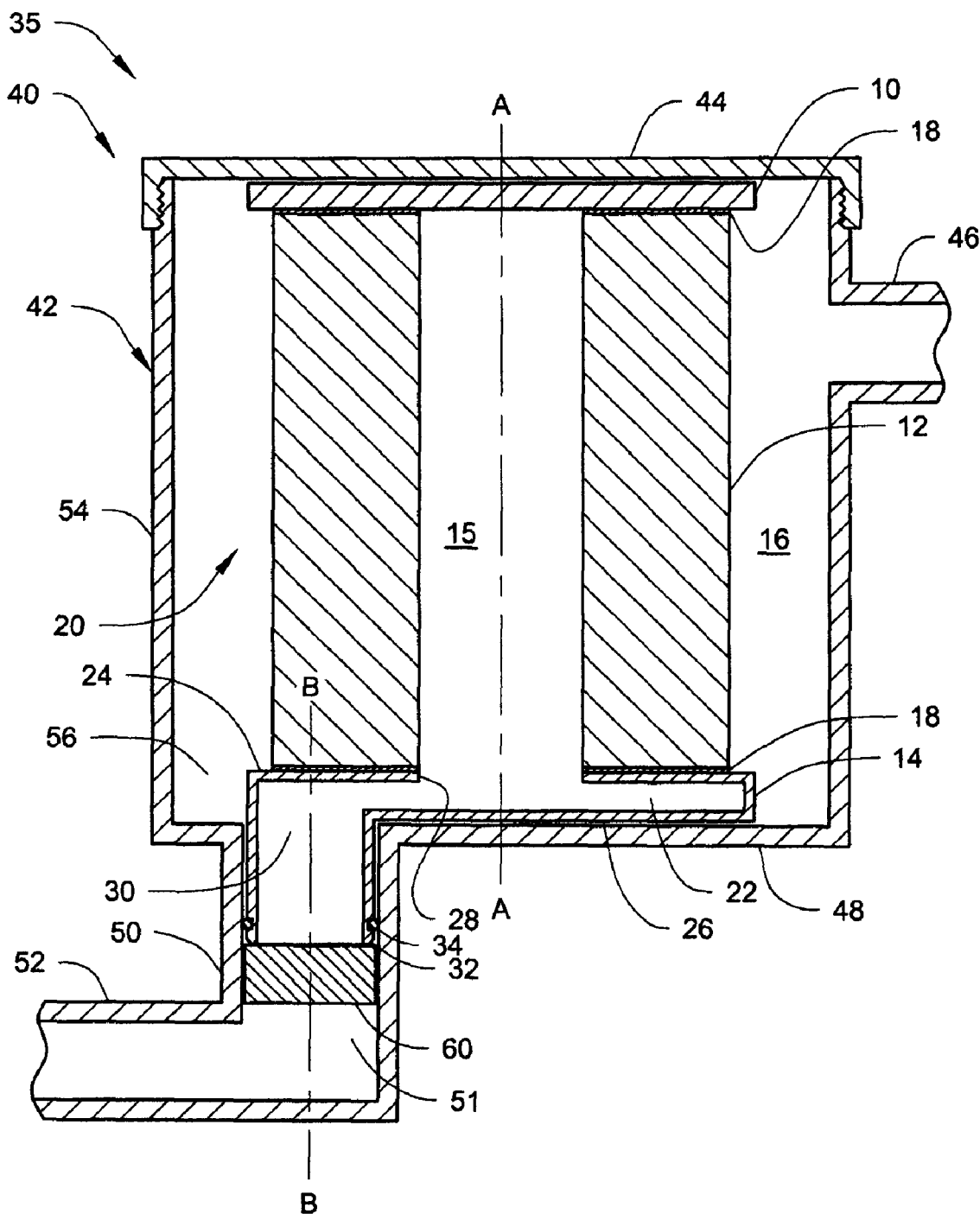
FIG. 1 is a side sectional view of an embodiment of a filter cartridge within a filter housing.
Figure 2:
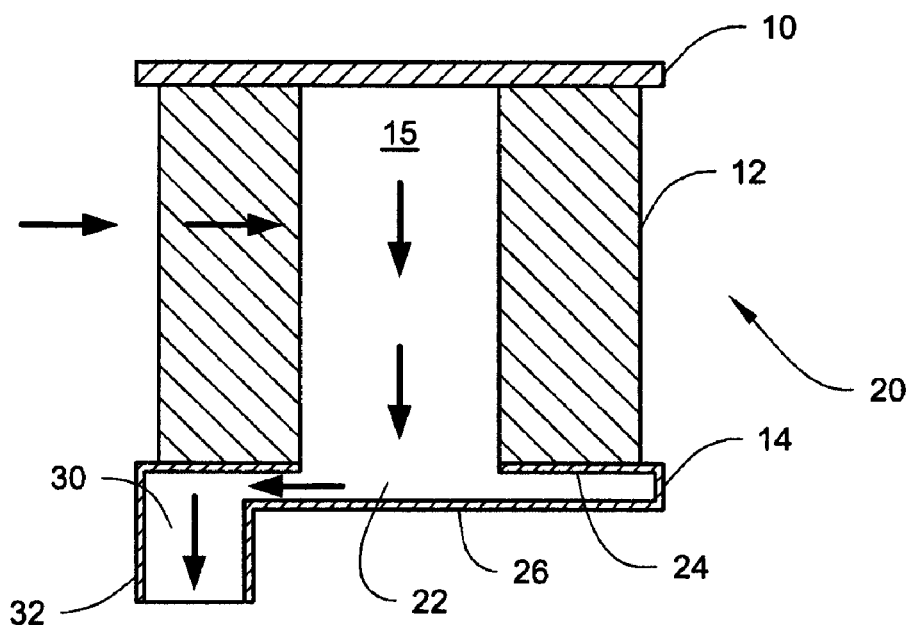
FIG. 2 is a schematic side sectional view of the filter cartridge of FIG. 1.

Referring to the drawings, wherein like reference numerals generally designate identical or corresponding parts throughout the several views, and more particularly to FIGS. 1 and 2, there is shown an embodiment of a filter cartridge designated generally by the numeral 20. For sake of convenience, this description will describe the filter cartridge 20 as being a fuel filter cartridge that filters fuel in an engine. However, it is to be realized that the concepts described herein can be applied to the filtration of other engine fluids, for example lubrication, hydraulic, and air, and can be applied to non-engine applications that require fluid filtration.

In the case of fuel filtration, the filter cartridge 20 prevents engine operation if the incorrect filter cartridge is installed.

The filter cartridge 20 includes a first endplate 10 attached to a first or upper end of a filter element 12. A second or lower end of the filter element 12 is attached to a second endplate 14. The filter element 12 is attached to the endplates 10, 14 using, for example, an adhesive 18. The filter element 12 and endplates 10, 14 can be attached by alternative means, for example by using heat to bond the endplates to the filter element.

The filter cartridge 20 is designed for outside-in flow, as shown by the arrows in FIG. 2, whereby the filter element 12 includes an inside portion 15 defining a clean fuel side and an outside portion 16 defining a dirty fuel side (as shown in FIG. 1).

The endplate 14 includes a flow passage 22 defined therein. The flow passage 22 is between a first or upper plate portion 24 and a second or lower plate portion 26 of the endplate 14. The plate portions 24, 26 are generally parallel to each other.

The flow passage 22 includes an inlet 28 in the plate portion 24 that is in communication with the inside portion 15 of the filter element 12. In the illustrated embodiment, the inlet 28 is aligned with a central, longitudinal axis A-A of the filter element and has a diameter roughly equal to an inner diameter of the filter element 12. However, other inlets can be used, for example multiple inlets or an inlet offset from the axis A-A, as long as sufficient fuel is allowed to flow into the passage 22.

The endplate 14 also includes a fluid outlet 30 that is formed in the plate portion 26. The outlet 30 is in communication with the passage 22 to permit fuel to flow out of the endplate 14. A longitudinal axis B-B of the outlet 30 is offset from, and generally parallel to, the axis A-A.

The outlet 30 includes a nipple 32 that projects downwardly from the plate portion 26. The nipple 32 includes an o-ring seal 34, the purpose of which is described below.

During use, the filter cartridge 20 is disposed in a filter housing 40, which together form a filter assembly generally designated by the numeral 35. The filter housing 40 includes a first housing portion that comprises a filter housing body 42, and a second housing portion that comprises a cover 44.

The filter housing body 42 includes a side wall 54, a fuel inlet port 46 in the side wall 54, an end wall 48, an outlet guide 50, and an outlet port 52. The filter housing side wall 54 is generally cylindrically shaped, having a longitudinal axis coinciding with the longitudinal axis A-A, although other configurations may be easily envisioned.

The side wall 54 and the end wall 48 define a filter space 56, with the end wall 48 defining the closed end of the space 56, and the side wall 48 defining an open end opposite the end wall 48.

The cover 44 is detachably connected to the side wall 54 for closing the open end thereof. In the illustrated embodiment, the cover 44 is connected to the side wall 54 via threads. However, other forms of detachable connection, for example clamps, a bayonet fitting, threaded fasteners, etc. can be used.

The inlet port 46 allows fuel to flow into the housing 40 and to the dirty fuel side 16 of the filter element 12. The inlet port 46 is illustrated as being formed in the side wall 54, although other locations for the inlet port 46 can be used provided the fuel flows to the dirty fuel side 16.

The outlet guide 50 is configured to receive the nipple 32 on the filter cartridge 20, thereby acting as a guide for the insertion of the filter cartridge 20 into the filter housing body 42. The o-ring 34 on the nipple 32 seals with the guide 50 to prevent fuel leakage. The guide 50 includes an outlet passage 51 that leads to the outlet port 52 which is connected to downstream components, for example a fuel pump of the engine.

In the illustrated embodiment, the guide 50 has an axis that corresponds with the axis B-B, whereby the axis of the guide 50 is offset from the axis A-A.

A valve mechanism 60, shown schematically in FIG. 1, is provided in the outlet passage 51. The valve mechanism 60 is normally closed when a filter cartridge is not installed to prevent or restrict the amount of fuel that can flow through the outlet passage 51. The valve mechanism 60 is actuated to an open position by the nipple 32 when the nipple is inserted into the guide 50 upon cartridge installation. The valve mechanism 60 can be any type of valve that controls fluid flow through the outlet passage 51, and that can be actuated open by the filter cartridge.

To install a new filter cartridge 20 into the filter housing 40, one first disengages the filter housing cover 44 from the filter housing body 42. The used filter cartridge is removed and the valve mechanism will close to prevent flow of unfiltered fluid. The new filter cartridge 20 is then lowered into the filter housing body 42. The nipple 32 must align with and enter the guide 50 in order for the filter cartridge 20 to seat properly within the housing 40 and for the valve mechanism to be actuated open. If the nipple 32 and the guide 50 do not align, the filter cartridge 20 will sit skewed within the housing 40 and prevent fitting of the cover 44 onto the body 42. In addition, if a non-authorized filter having a standard endplate without a nipple 32 is used, the standard endplate will fit over the guide 50 and close off the guide opening, preventing fuel from flowing into the outlet passage 51. In addition, the valve mechanism will be closed to prevent fluid that does enter the clean outlet passage 51 from exiting to the port 52.

Figure 3:
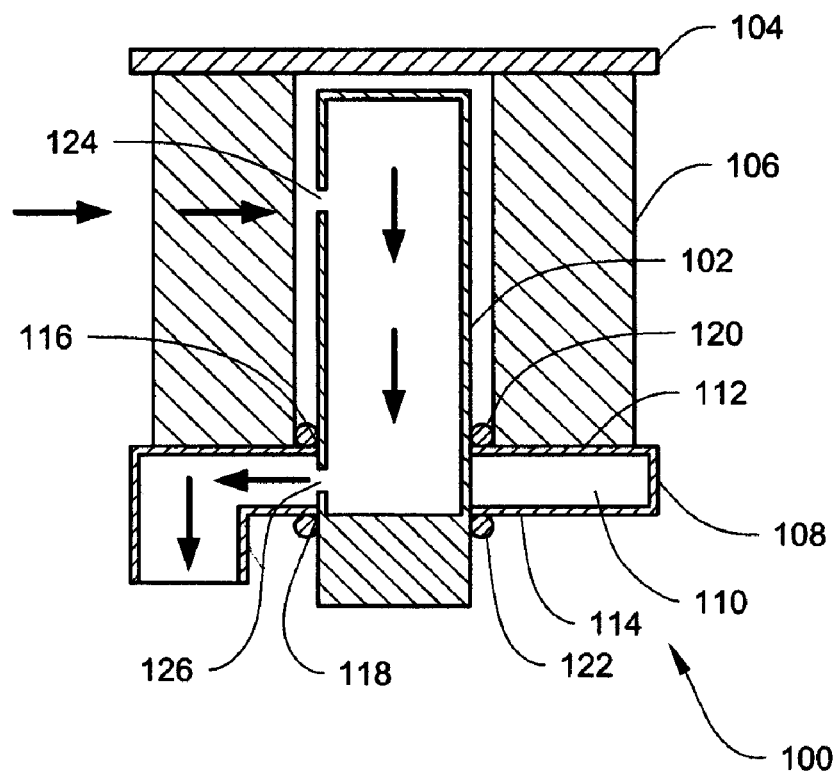
FIG. 3 is a schematic side sectional view of an alternative embodiment of a filter cartridge disposed around a standpipe of a filter housing.

FIG. 3 illustrates an alternative embodiment of a filter cartridge 100. The filter cartridge 100 is designed to fit around a standpipe 102 that is fixed to the filter housing (not shown). The filter cartridge 100 is similar to the filter cartridge 20, including having a first endplate 104 attached to a first or upper end of a filter element 106, and a second or lower end of the filter element 106 attached to a second endplate 108.

The endplate 108 includes a flow passage 110 defined therein. The flow passage 110 is between a first or upper plate portion 112 and a second or lower plate portion 114 of the endplate 108. The plate portions 112, 114 are generally parallel to each other.

Openings 116, 118 are formed in the plate portions 112, 114 through which the standpipe 102 extends when the filter cartridge 100 is inserted. O-ring seals 120, 122, or other suitable seals, are disposed on the plate portions 112, 114 around each opening 116, 118 to seal with the standpipe 102 to prevent fuel leakage.

The standpipe 102 includes one or more openings 124 positioned at the clean side of the filter element 106 through which clean fuel can enter into the standpipe 102, as shown by the arrows in FIG. 3. In addition, the standpipe 102 includes one or more openings 126 near the base thereof where the standpipe passes through the passage 110, whereby fuel can flow from inside the standpipe into the flow passage 110, as shown by the arrows in FIG. 3. Once in the flow passage, the fuel exits the endplate 108 in a manner similar to the filter cartridge 20.

As shown in FIG. 3, the standpipe 102 is substantially hollow from the top thereof to the point where it passes through the opening 118. The remainder of the standpipe 102 below the opening 118 is solid. However, other standpipe configurations are possible, as long as sufficient fuel can flow from the opening(s) 124 to the opening(s) 126.

The filter cartridge 100 is inserted into a filter housing in a manner similar to the filter cartridge 20. However, the filter cartridge 100 is also inserted over the standpipe 102 of the filter housing. Other than the standpipe 102, the filter housing used with the filter cartridge 100 can be generally similar to the filter housing 40.

Other embodiments are possible. For example, the filter cartridges 20, 100 have been described as being of the outside-in flow type. However, the concepts described herein could be applied to an inside-out flow type filter cartridge as well.

The embodiments disclosed herein may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A filter cartridge comprising:
    a filter element having a first end, a second end, an outside portion, and an inside portion, said inside portion defining an interior space to receive a fluid that has been filtered by said filter element;
    a first endplate bonded to said first end of said filter element; and
    a second endplate bonded to said second end of said filter element, said second endplate including a flow passage therein with an inlet in communication with said inside portion of said filter element, and a fluid outlet in communication with said flow passage,
    wherein said second endplate includes a first plate portion bonded to the second end of the filter element and a second plate portion spaced from and generally parallel to said first plate portion, and
    wherein a portion of the flow passage is between the first plate portion and the second plate portion.

2. The filter cartridge of claim 1 wherein said filter element includes a longitudinal axis, and said fluid outlet is offset from the longitudinal axis, and the inlet is along the longitudinal axis.

3. The filter cartridge of claim 1 wherein the inlet is in the first plate portion and said fluid outlet is in said second plate portion.

4. The filter cartridge of claim 1 further comprising:
aligned openings formed in said first plate portion and said second plate portion; and
a seal surrounding each of said aligned openings, the seal surrounding the aligned opening in the first plate portion is disposed in the interior space of the filter element.

5. A fuel filter comprising:
a filter element having a first end, a second end, a dirty fuel side, and a clean fuel side;
a first endplate bonded to said first end of said filter element; and
a second endplate bonded to said second end of said filter element, said second endplate including a flow passage therein with an inlet in communication with said clean fuel side of said filter element, and a fuel outlet in communication with said flow passage, said fuel outlet including a projection that projects from the second endplate,
wherein said second endplate includes a first plate portion bonded to the second end of the filter element and a second plate portion spaced from and generally parallel to said first plate portion, and
wherein a portion of the flow passage is between the first plate portion and the second plate portion.

6. The fuel filter of claim 5 wherein said clean fuel side includes an interior opening that is surrounded by said filter element.

7. The fuel filter of claim 5 wherein said filter element includes a longitudinal axis, and said fuel outlet is offset from the longitudinal axis, and the fuel outlet does not overlap the inlet.

8. The fuel filter of claim 7 wherein said inlet is along the longitudinal axis.

9. The fuel filter of claim 5 wherein the inlet is in the first plate portion and said fuel outlet is in said second plate portion.

10. The fuel filter of claim 5 further comprising:
aligned openings formed in said first plate portion and said second plate portion; and
a seal surrounding each of said aligned openings, the seal surrounding the aligned opening in the first plate portion is disposed in the clean fuel side of the filter element.

11. A filter housing comprising:
a first housing portion including a body having a side wall and an end wall defining a filter space with a central axis, the end wall forming a closed end of the filter space, and the body having an open end opposite the end wall;
a second housing portion including a cover detachably connected to the side wall for closing the open end of the body, and the cover is detachably connected to the side wall using threads, clamps, a bayonet fitting or threaded fasteners;
a fluid inlet port on said side wall having a flow passage in fluid communication with the filter space; and
a guide formed on the end wall and configured to receive a projection of a filter cartridge inserted thereinto, the guide being offset from the central axis, and the guide including a fluid outlet passage.

12. The filter housing of claim 11, further comprising a standpipe extending upwardly from the end wall along the central axis into the filter space toward the open end, the standpipe including an internal flow passage.

13. The filter housing of claim 11, wherein the guide comprises a recess formed in the end wall spaced from the central axis.

14. The filter housing of claim 11, wherein the fluid outlet passage includes an axially extending inlet portion extending parallel to the central axis, and a valve is disposed in the axially extending inlet portion.

15. The filter housing of claim 12, wherein the standpipe includes an inlet into the internal flow passage, and a radial outlet from the internal flow passage.

16. A filter assembly, comprising:
a filter housing including:
a first housing portion including a body having a side wall and an end wall defining a filter space with a central axis, the end wall forming a closed end of the filter space, and the body having an open end opposite the end wall;
a second housing portion including a cover detachably connected to the side wall for closing the open end of the body;
a fluid inlet port on said side wall having a flow passage in fluid communication with the filter space; and
a guide formed on the end wall and configured to receive a portion of a filter cartridge inserted into the filter space, the guide being offset from the central axis, and the guide including a fluid outlet passage at least a portion of which extends parallel to the central axis;
a valve provided in the portion of the fluid outlet passage that extends parallel to the central axis;
a filter cartridge within the filter space, the filter cartridge including:
a filter element having a first end, a second end, an outside portion, and an inside portion;
a first endplate bonded to said first end of said filter element; and
a second endplate bonded to said second end of said filter element, said second endplate including a flow passage therein with an inlet in communication with said inside portion of said filter element, and a fluid outlet in communication with said flow passage, with the fluid outlet being engaged with the guide whereby the fluid outlet is in communication with the fluid outlet passage; and
the valve is positioned in the fluid outlet passage at a location to be engaged by the fluid outlet of the second endplate.

17. The filter assembly of claim 16, wherein the guide comprises a recess formed in the end wall spaced from the central axis, and the fluid outlet comprises a projection received within the guide.

18. The filter assembly of claim 16 wherein the filter housing further comprises a standpipe extending upwardly from the end wall along the central axis into the filter space toward the open end through the inside portion of the filter element; the standpipe including an internal flow passage, an inlet into the internal flow passage, and a radial outlet from the internal flow passage into the flow passage of the second endplate.

19. The filter cartridge of claim 1, wherein said fluid outlet comprises a projection that projects from the second endplate.

20. The filter housing of claim 11 further comprising a valve disposed inside the fluid outlet passage and configured to be actuated to an open position upon installation of a filter cartridge.

21. The filter assembly of claim 16, wherein the valve actuates to an open position when the fluid outlet is engaged with the guide.

22. The filter cartridge of claim 1, wherein the first endplate is bonded to the first end of the filter element using an adhesive or heat, and the second endplate is bonded to the second end of the filter element using an adhesive or heat.

23. The filter cartridge of claim 2, wherein at least a portion of the flow passage extends in a direction perpendicular to the longitudinal axis, and the fluid outlet does not overlap the inlet.

24. The filter cartridge of claim 1, wherein the inlet is offset from the fluid outlet.

* * * * *